United States Patent [19]

Newsome

[11] Patent Number: 5,343,915

[45] Date of Patent: Sep. 6, 1994

[54] INSULATED SECURITY CAR COVER

[76] Inventor: Willie D. Newsome, 1007 Cascade St., Apt. B, Mesquite, Tex. 75149

[21] Appl. No.: 955,452

[22] Filed: Oct. 2, 1992

[51] Int. Cl.⁵ .............................................. B60J 11/00
[52] U.S. Cl. ...................................... 150/166; 296/136
[58] Field of Search ............... 150/166, 167; 296/136, 296/78.1; 206/335

[56] References Cited

U.S. PATENT DOCUMENTS

| | | | |
|---|---|---|---|
| 1,950,973 | 4/1933 | Levine | 150/166 R |
| 2,571,362 | 10/1951 | Hervey | 150/166 X |
| 2,646,097 | 7/1953 | Gaverth et al. | 150/166 |
| 2,718,912 | 9/1955 | Zimmerman | 150/166 |
| 2,787,311 | 4/1957 | Cohen et al. | 150/166 |
| 3,024,063 | 3/1962 | Robinson | 150/166 X |
| 3,316,012 | 4/1967 | Thier | 150/166 X |
| 3,910,330 | 10/1975 | Johnson et al. | 150/166 |
| 4,154,254 | 5/1979 | Spencer | 150/166 |
| 4,274,077 | 6/1981 | Feiger | 296/136 X |
| 4,355,839 | 10/1982 | Rosen | 150/166 |
| 4,807,922 | 2/1989 | Glover | 296/136 |
| 4,938,522 | 7/1990 | Herron et al. | 150/166 X |
| 4,940,276 | 7/1990 | Madison | 296/136 |
| 5,029,933 | 7/1991 | Gillem | 150/166 X |
| 5,050,924 | 9/1991 | Hansen | 296/100 |
| 5,057,169 | 10/1991 | Adelman | 150/166 X |
| 5,112,098 | 5/1992 | Lichtmann | 296/136 |
| 5,161,849 | 11/1992 | Holland, Jr. | 150/166 X |
| 5,167,267 | 12/1992 | McQuaid | 150/166 |
| 5,242,205 | 9/1993 | Garner | 150/166 X |

FOREIGN PATENT DOCUMENTS

| | | | |
|---|---|---|---|
| 1933669 | 11/1970 | Fed. Rep. of Germany | 150/166 |
| 1034045 | 7/1953 | France | 150/166 |
| 1161991 | 9/1958 | France | 296/136 |
| 2418309 | 10/1979 | France | 296/136 |
| 2629764 | 10/1989 | France | 296/136 |
| 61-12432 | 1/1986 | Japan | 296/136 |
| 9215467 | 9/1992 | PCT Int'l Appl. | 296/136 |
| 513435 | 10/1939 | United Kingdom | 150/166 |
| 785039 | 10/1957 | United Kingdom | 296/136 |
| 790852 | 2/1958 | United Kingdom | 296/136 |
| 815798 | 7/1959 | United Kingdom | 296/136 |
| 1003621 | 9/1965 | United Kingdom | 150/166 |

Primary Examiner—Sue A. Weaver
Attorney, Agent, or Firm—John E. Vandigriff

[57] ABSTRACT

The invention is a multi layer cover for an automobile that has an outer water proof layer, an inner soft layer to protect the finish of the automobile, and a padded middle layer to absorb shock of objects striking the automobile. A securing cable extends under the automobile and is in a channel in or over the cover to secure the cover to the automobile and to prevent intruders from opening the doors of the automobile during storage. A flap over at least one door may be opened by the owner to enter the automobile while the cover is in place over the automobile. A cover flap protects fasteners securing the door flap. A cable is connected to two eyelets to prevent opening the flap and door flap.

18 Claims, 2 Drawing Sheets

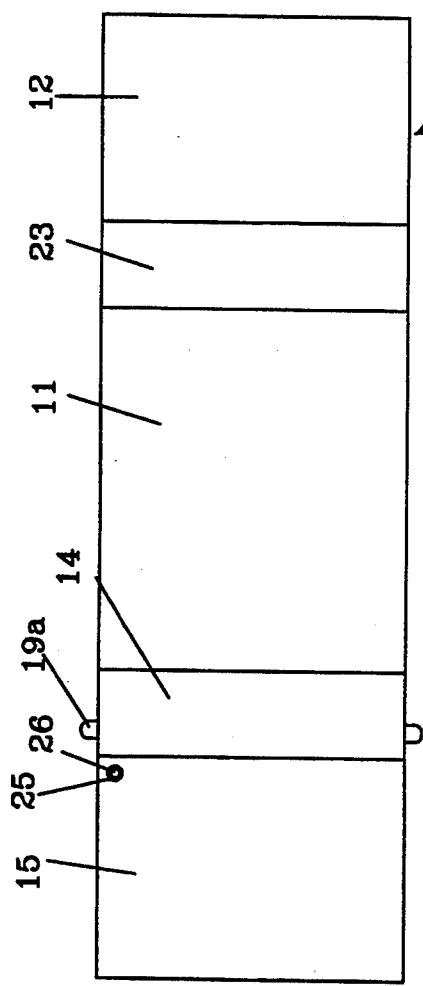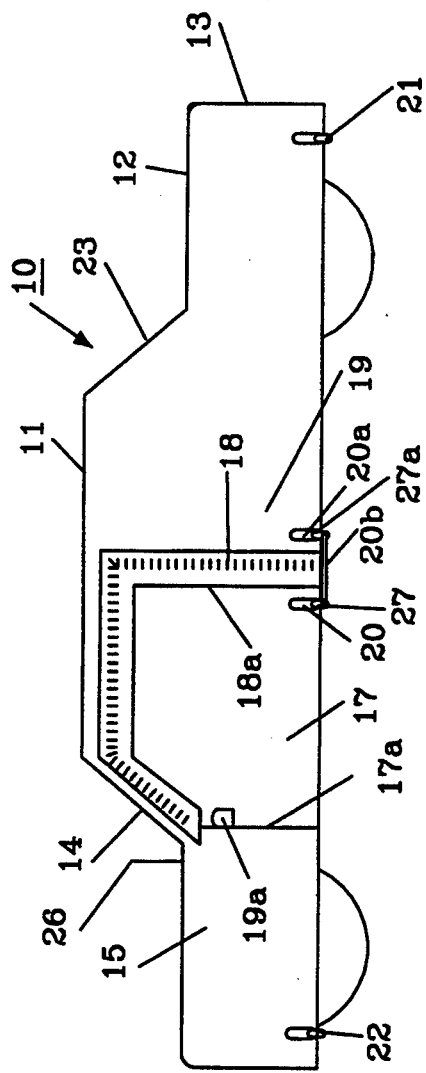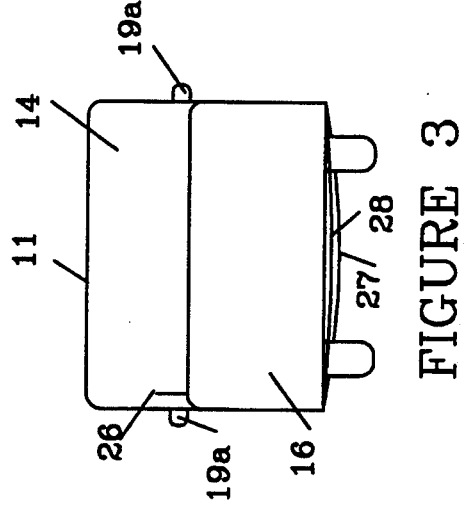

INSULATED SECURITY CAR COVER

FIELD OF THE INVENTION

This invention relates to covers for vehicles, and more particularly to an insulated security car cover.

BACKGROUND OF THE INVENTION

There are numerous designs of covers for automobiles. Included are simple cloth covers for protecting the automobile finish from sun light and heat. Some covers include vent openings to prevent moisture deposits from forming on the automobile body. Other covers include reinforced areas to hold the cover raised over the automobile so that the cover encloses part of the automobile, but does not come in contact with the automobile surface.

An object of most prior art automobile covers is to provide a light weight cover easily installed and stored. These covers are not intended for long time storage, security purposes, or to prevent damage during storage from, for example, hail or other objects which may come into contact with the automobile during storage.

| LIST OF PRIOR ART | |
| --- | --- |
| PATENT No. | PATENTEE |
| 3,316,012 | Thier |
| 4,699,192 | Kamen et al. |
| 4,821,785 | Rolan |
| 4,857,216 | McKee |
| 4,973,100 | Yang |
| 5,115,848 | Malone |

SUMMARY OF THE INVENTION

The invention is a protective automobile cover. The cover is a laminated or layered construction having an outer layer of a water proof material such as a plastic or nylon. A central layer is a padding of a shock absorbing material such a as polyethylene foam. The inner layer is of a material, which when in contact with the surface of the automobile, will not scratch or damage the automobile finish. One such material may be a felt material.

The cover includes an opening through which the automobile antenna may protrude. Also provided are pockets in each side which cover side mirrors.

The side of the cover that covers the driver's side door has provision to fold back part of the cover to expose the door. A flap secured by a zipper, snaps, Velcro fastener, or other closure means may be folded back allowing the door to be opened to allow access to the interior of the automobile without removing the cover from the automobile.

Another feature of the cover is at least one steel cable extends in a channel between two of the cover layers of material, or in a channel formed on the outside of the cover. The cable extends completely through the cover such that there is one end on each side of the automobile. One end of the cable extends from the cover and is long enough to reach under the automobile and can be attached to the other end on the other side of the automobile and secured thereto. This prevents the cover from being removed from the automobile, and if positioned over the doors, prevents opening the doors when the cable is in place.

Eyelets are placed around the bottom edges of the cover such that cords, elastic bands, or other securing devices may be attached to the eyelets, extending under the automobile, holding the cover in place.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 1 is a side view of the automobile cover;

FIG. 2 is a top view of the automobile cover;

FIG. 3 is a front-end view of the cover;

DESCRIPTION OF A PREFERRED EMBODIMENT

Figure 4:
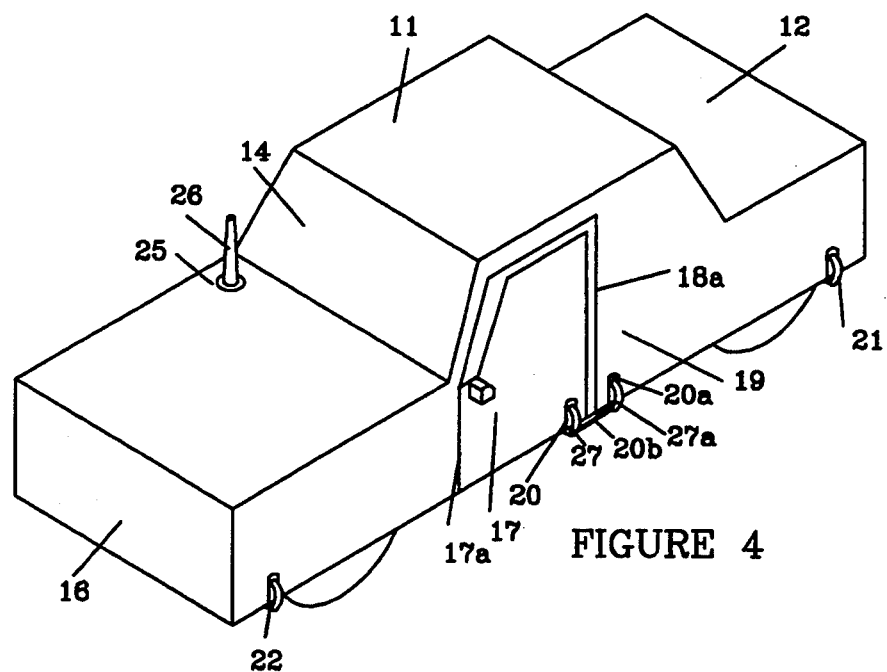
FIG. 4 is am isometric view of the cover.

FIG. 1 is a side view of the automobile cover covering an automobile. Cover 10 has a rear end panel 13 attached to a panel 12 covering the trunk area of the automobile. A top section 11 is attached by window cover panel 23 and to a hood cover panel 15 by a windshield panel 14. Panel 16 covers the grill of the automobile. The above top and end panels are attached to two bide panels 19. Each of the above panels may be individual panels sewn together, or several panels may be made a single piece of material.

In at least one side is a panel 17 that may be folded back to provide access to the interior of the automobile. Panel 17 may be releaseably secured to side 19 by button, snaps, zippers or any other means 18 such that when released, panel 17 may be folded back at 17a providing access to the automobile door (not illustrated) while the cover is in place over the automobile. A cover flap 18a covers the snaps or zipper securing panel 17 to protect then from adverse weather conditions.

On each panel 19, on each side of the cover are eyelets 20–22 to which are attached cords or elastic straps that extend under the automobile and attach to eyelets on the opposite side of the automobile. Eyelets may be placed in the back panel 13 and from panel 16 to provide for hold down of the front and back panels.

In the embodiment illustrated, a security cable 27 is laminated in the multi-layer cover and extends from the edge of one side panel across the top panel 11 and down second side panel. Cable 27 (FIG. 3) extends under the automobile and is attached to the end of the cable extending out the bottom of the opposite side panel. The two ends may be secured together by a padlock or other securing device. By placing a cable over the doors of the automobile, the automobile doors may not be opened, providing security to the automobile. A second security cable may be placed over the rear door. Cable 27a, extending through the cover and out eyelet 20a, extends under the automobile and secures the rear doors. A small cable 20b may be used to secure cables 27 and 27a together. No one can enter and start the automobile nor can they access under the hood to start the automobile. This provides for secure storage of the automobile.

FIG. 2 is a top view of the automobile cover 10, showing the top panels and pockets 19a formed in the side panels 19 to cover and protect side view mirrors.

Top panel 15 has an opening or eyelet 25 through which the automobile antenna 26 extends. Although the antenna 26 and eyelet 25 are shown in panel 15 it may be in any appropriate panel where the antenna is located.

FIG. 3 is a front end view of the cover showing side mirror pockets 19a. Also shown is security cable 27 extending from one side, under the automobile to the other side. Hold down cable 28 connected between two eyelets 22 is shown holding the front of the cover in place.

FIG. 4 is an isometric view of the automobile cover over an automobile. Eyelet 20 with security cable 27 extending out of the cover is shown. It should be noted that the automobile cover is formed to fit securely around the automobile.

Figure 5B:
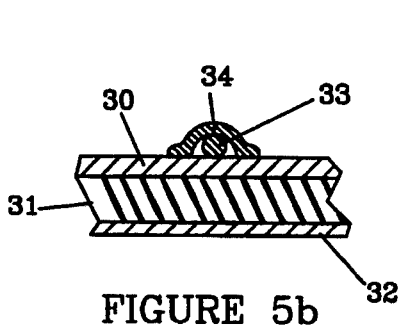
FIG. 5b is a cross-sectional view showing a security cable formed on the outside of the cover.
Figure 5A:
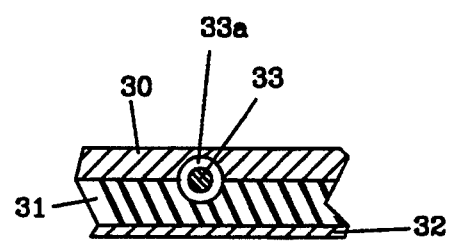
FIG. 5a is a cross-sectional view showing three layers of the cover and the security cable in a channel between two layers.

FIG. 5a is across-sectional view of a section of the automobile cover. The cover is made up of, for example, three layers of materials. The first outer layer 30 is layer of a water proof or water repellent material, which may be, for example, a polyethylene, vinyl, nylon, or other such material. The center layer 31 may be a shock absorbent material such as foam rubber or polyethylene foam. The third or inside layer 32 of the cover may be of a soft material that will not scratch or mar the surface of the automobile. In one example, felt was used.

Embedded in the cover, between the outside and center layer is a steel security cable. Cable 33 is placed in channel 33a between the layers 30 and 31 to prevent the cable from scratching or damaging the vehicle-surface due to rubbing or physical contact.

FIG. 5b shows a cross-section view as in FIG. 5a except that a channel 34 is formed on the outside of the cover, and cable 33 is inside channel 34. Cable 33 can be removed from the cover in either the configuration of FIG. 5a or 5b. Removal of the cable is desirable when removing the cover for folding and storage.

The automobile cover described above is useful for long time storage in an outside environment. The center layer of foam material will protect the automobile from small hail particle damage since the foam will absorb the impact of the small particles or other small objects that may be thrown at, or accidentally hit the covered automobile. The security cable will protect the interior from theft or damage by unwanted intruders and will prevent the cover from being removed allowing access to the automobile interior or the engine compartment. Other cables may be placed in the cover, for example over the engine area and the trunk area. The small openable panel on at least one side of the cover provides access to the interior of the automobile by the owner, while the cover is in place.

What is claimed:

1. A protective security cover for protecting vehicles during storage, comprising:
   a multi layer cover, including at least first, second and third layers for covering a vehicle;
   a security cable extending through an enclosed channel in said cover between two of said layers and extending completely around said vehicle to secure the vehicle; and
   a plurality of tie-down cables, attached to said cover for securing the cover over the vehicle.

2. The cover according to claim 1, wherein said first layer is an outer layer and is impervious to water.

3. The cover according to claim 1, wherein said third layer is an inside layer and is of a soft material to protect the surface of the vehicle against abrasion by the cover.

4. The cover according to claim 1, wherein said second layer is of a foam material protecting said vehicle against damage when moving objects come into contact with said vehicle surface.

5. The cover according to claim 4 wherein said second layer is of polyethylene foam.

6. The cover according to claim 1 wherein said cable is between said first and second layers such that the second layer protects the vehicle finish from said cable, and extends around the vehicle and the vehicle doors such that the doors cannot be opened and the cover cannot be removed when the cable is secured around the vehicle.

7. The cover according to claim 1, wherein said cover includes at least one opening, and a flap for covering said opening adjacent a door of the vehicle that may be opened to permit entry into the vehicle while the cover is over the vehicle.

8. The cover according to claim 7, wherein said opening has a fastener around at least part of the opening to secure said flap over the opening.

9. An vehicle security cover, comprising:
   a multi layer cover, including first, second layers, for covering and protecting the finish of a vehicle during storage;
   a security cable extending through said cover, in a closed channel between two of said multi layers and extending completely around said vehicle and over the doors of the vehicle to secure the vehicle; and
   a plurality of tie-down cables, attached to the cover for securing the cover over the vehicle.

10. The cover according to claim 9, wherein of said first, second and third layers, said first layer is an outer layer and is impervious to water.

11. The cover according to claim 10, wherein said third layer is an inside layer and is of a soft material to protect the surface of the vehicle against abrasion by the cover.

12. The cover according to claim 10, wherein said second layer is of a foam material protecting said vehicle against damage when moving objects come into contact with said vehicle surface.

13. The cover according to claim 10, wherein said second layer is of polyethylene foam.

14. The cover according to claim 9 wherein said cable is between said first and second layers such that the second layer protects the vehicle finish from said cable, and extends around the vehicle and the vehicle doors such that the doors cannot be opened and the cover cannot be removed when the cable is secured around the vehicle.

15. The cover according to claim 9, wherein said cover includes at least one opening, and a flap for covering said opening adjacent a door of the vehicle that may be opened to permit entry into the vehicle while the cover is over the vehicle.

16. The cover according to claim 15, wherein said opening has a fastener around at least part of the opening to secure said flap over the opening.

17. The cover according to claim 9, including a second security cable, said cable securing front right and left doors, and said second security cable securing right and left rear doors of said vehicle during storage.

18. A protective security cover for protecting vehicles during storage, comprising:
a multi layer cover for covering a vehicle, including;
an outer layer of a water repellent material;
a middle layer of a foam material;
an inner layer of a soft scratch free material;
a plurality of tie-down cables, attached to the cover for securing the cover over the vehicle; and
a security cable extending through said cover, in a closed channel between two of said multi layers and extending completely around said vehicle and over the doors of the vehicle to secure the vehicle.

* * * * *